US007302491B2

(12) United States Patent
Brown et al.

(10) Patent No.: US 7,302,491 B2
(45) Date of Patent: Nov. 27, 2007

(54) SYSTEM AND METHOD OF REDUCING DATA CORRUPTION DUE TO RECYCLED IP IDENTIFICATION NUMBERS

(75) Inventors: Deanna Lynn Quigg Brown, Pflugerville, TX (US); Lilian Sylvia Fernandes, Austin, TX (US); Vinit Jain, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 855 days.

(21) Appl. No.: 10/631,064

(22) Filed: Jul. 31, 2003

(65) Prior Publication Data

US 2005/0025185 A1    Feb. 3, 2005

(51) Int. Cl.
*H04J 3/24*  (2006.01)
*H04J 3/16*  (2006.01)
*H04L 12/96*  (2006.01)

(52) U.S. Cl. .................. 709/236; 370/474; 370/465; 370/252

(58) Field of Classification Search ............... 709/236, 709/200; 370/252, 465, 474
See application file for complete search history.

(56) References Cited

U.S. PATENT DOCUMENTS

| 5,333,135 | A  | * | 7/1994  | Wendorf ..................... 370/394 |
| 5,737,009 | A  | * | 4/1998  | Payton ........................ 725/93  |
| 6,714,985 | B1 | * | 3/2004  | Malagrino et al. .......... 709/236 |
| 6,891,832 | B1 | * | 5/2005  | Chien et al. ............. 370/395.1 |
| 6,894,976 | B1 | * | 5/2005  | Banga et al. ................ 370/235 |
| 2001/0010059 | A1 | * | 7/2001  | Burman et al. ............. 709/224 |
| 2002/0143955 | A1 | * | 10/2002 | Shimada et al. ............ 709/227 |
| 2002/0173308 | A1 | * | 11/2002 | Dorenbosch et al. ....... 455/435 |
| 2005/0025185 | A1 | * | 2/2005  | Brown et al. ............... 370/474 |
| 2006/0190591 | A1 | * | 8/2006  | Bobde et al. ............... 709/224 |

OTHER PUBLICATIONS

*IPv6 Vs. IPv4 Writes Tale of Two Protocols*, Electronic Engineering Times, Aug. 18, 1997, p. 82.

(Continued)

*Primary Examiner*—David Wiley
*Assistant Examiner*—Mark Fearer
(74) *Attorney, Agent, or Firm*—Volel Emile; Leslie A. Van Leeuwen; D'Ann N. Rifai

(57) ABSTRACT

A system and method of reducing data corruption due to recycled Internet Protocol (IP) identification numbers are provided. When IP packets are being fragmented and the IP identification number of the packets is cycling through a specific group of numbers, the size of the first fragment of a packet is decremented each time the IP identification cycles through the numbers. Initially, the size of the first fragment of a packet will be set to a maximum number. This size will be decremented at each pass of the IP identification through the numbers until the size of the first fragment of a packet reaches a pre-defined minimum size. When that occurs, the size of the first fragment of a packet will again be set to the maximum number. By decrementing the size of the first fragment, fragment offset of the other fragments that make up the packet will be changing. This then reduces the likelihood of having two fragments having the same IP identification number be mistaken as being from the same packet.

20 Claims, 8 Drawing Sheets

OTHER PUBLICATIONS

*Next Generation IP Takes Shape (Internet Protocol)*, by Gerald H. Mendes, Business Communications Review, n3, v26, Mar. 1996, p. 49(5).

*IPv6: The Next Generation Internet Protocol*, by Gary Kessler, Internet/Web/Online Service Informaion, Network VAR, n2, v5, Feb. 1997, p32(7).

* cited by examiner

| BIT | 0 | 1 | 2 | 3 | 4 | 5 | 6 | 7 |
|---|---|---|---|---|---|---|---|---|
| BYTE 0 | 500 | VERSION | | | H LENGTH | | | |
| BYTE 1 | SERVICE TYPE |||||||| 
| BYTE 2 | TOTAL LENGTH ||||||||
| BYTE 3 | ||||||||
| BYTE 4 | IDENTIFICATION ||||||||
| BYTE 5 | ||||||||
| BYTE 6 | 510 | FLAGS || | FRAGMENT OFFSET ||||
| BYTE 7 | FRAGMENT OFFSET ||||||||
| BYTE 8 | TIME-TO-LIVE ||||||||
| BYTE 9 | PROTOCOL ||||||||
| BYTE 10 | CHECKSUM ||||||||
| BYTE 11 | ||||||||
| BYTE 12 | SOURCE IP ADDRESS ||||||||
| BYTE 13 | ||||||||
| BYTE 14 | ||||||||
| BYTE 15 | ||||||||
| BYTE 16 | DESTINATION IP ADDRESS ||||||||
| BYTE 17 | ||||||||
| BYTE 18 | ||||||||
| BYTE 19 | ||||||||
| BYTE 20 | IP OPTIONS ||||||||
| BYTE 21 | ||||||||
| BYTE 22 | ||||||||

FIG. 5

| FRAGMENT | IP IDENTIFICATION 508 | OFFSET 512 | MF BIT OF FLAGS 510 | UDP HEADER INCLUDED | AMOUNT OF DATA |
|---|---|---|---|---|---|
| 1 | 255 | 0 | 1 | YES | 776 BYTES |
| 2 | 255 | 776 | 1 | NO | 776 BYTES |
| 3 | 255 | 1552 | 0 | NO | 428 BYTES |

FIG. 6

| FRAGMENT | IP IDENTIFICATION 508 | OFFSET 512 | MF BIT OF FLAGS 510 | UDP HEADER INCLUDED | AMOUNT OF DATA |
|---|---|---|---|---|---|
| 1 | 255 | 0 | 1 | YES | 768 BYTES |
| 2 | 255 | 768 | 1 | NO | 776 BYTES |
| 3 | 255 | 1544 | 0 | NO | 436 BYTES |

FIG. 7

SYSTEM AND METHOD OF REDUCING DATA CORRUPTION DUE TO RECYCLED IP IDENTIFICATION NUMBERS

BACKGROUND OF THE INVENTION

1. Technical Field

The present invention is directed to communications networks. More specifically, the present invention is directed to a system and method of reducing data corruption due to recycled Internet Protocol (IP) identification numbers.

2. Description of Related Art

There are several local area network (LAN) technologies in use today, but the most popular is by far the Ethernet. The Ethernet is an open-standard technology. This openness, combined with the ease of use and robustness of the Ethernet system contribute to its widespread implementation in the industry.

The Ethernet supports data transfer rates of 10 Mbps (megabits per second). However, many customers currently have, or foresee having, network throughput bottlenecks due to faster server processors, new applications, and more demanding environments that require greater network data transfer rates than existing LANs can provide. In addition, as networks mature, server consolidation results in a greater number of users and more network traffic per average file server, further straining the throughput capabilities of existing LANs. New data-intensive applications, such as network file server backups and synchronized audio/video, require reduced latency, as well as new levels of data transmission speed and reliability. To meet this ever-increasing demand, faster Ethernet technologies are being defined with data throughput of 100 Mbps and 1000 Mbps. The 1000 Mbps Ethernet is referred to as a Gigabit Ethernet.

In any event, data is generally transmitted on a network in packets. Before being transmitted, however, several headers may be added to the packets. One of the headers that may be added is an IP header. The IP header has a two-byte identification field that is used to facilitate packet fragmentations. For example, as a packet is traversing the network, routers may fragment the packet into smaller packets. To ascertain that a receiving host is able to reconstruct a packet after it has been fragmented in transit, a transmitting host will give the packet an identity by entering a number into the IP identification field. If a packet is fragmented, each fragment will retain the IP identification number in its IP header. When the receiving host receives the fragments, using the IP identification number along with other fields in the IP header, it will be able to reconstruct the packet.

The two-byte identification field allows for 65,536 unique IP packets to be generated before the IP identification numbers recycle. With the use of the Gigabit Ethernet, however, this number of packets can be generated within one (1) second. Presently, it is rather common to have fragment re-assembly timers of thirty (30) seconds. Thus, using a fragment re-assembly timer of thirty (30) seconds with the Gigabit Ethernet may result in two or more packets having the same IP identification number on the network.

When this occurs, if one or more fragments from a first packet are lost or dropped and if corresponding fragments from a second packet arrive at the receiving host within the 30-second re-assembly time of the first packet, the first packet may be re-assembled using the fragments from the second packet if the fragment offsets of the second packet match the fragment offsets of the first packet. Consequently, the re-assembled first packet will be erroneous. This error should in most cases be caught using a checksum value that is included in the IP header. Nonetheless, there may be times when the error may not be flagged by the checksum value. In these cases, erroneous data will be used.

Thus, what is needed is a method and apparatus for ascertaining that fragments from two or more different packets that may have the same IP identification number are distinguishable from each other.

SUMMARY OF THE INVENTION

The present invention provides a system and method of reducing data corruption due to recycled Internet Protocol (IP) identification numbers. When IP packets are being fragmented and the IP identification number of the packets is cycling through a specific group of numbers, the size of the first fragment of a packet is decremented each time the IP identification cycles through the numbers. Initially, the size of the first fragment of a packet will be set to a maximum number. This size will be decremented at each pass of the IP identification through the numbers until the size of the first fragment of a packet reaches a pre-defined minimum size. When that occurs, the size of the first fragment of a packet will again be set to the maximum number. By decrementing the size of the first fragment, fragment offsets of the other fragments that make up the packet will be changing. This then reduces the likelihood of having fragments from two different packets with the same IP identification number to be mistaken as being from the same packet.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 5 depicts an IP header in bytes format.

FIG. 6 depicts values of relevant fields of an IP header of fragments that make up a packet.

FIG. 7 depicts values of relevant fields of an IP header of fragments that make up a packet after the size of the first fragment of the packet is decremented.

DETAILED DESCRIPTION OF THE PREFERRED EMBODIMENT

Figure 1:
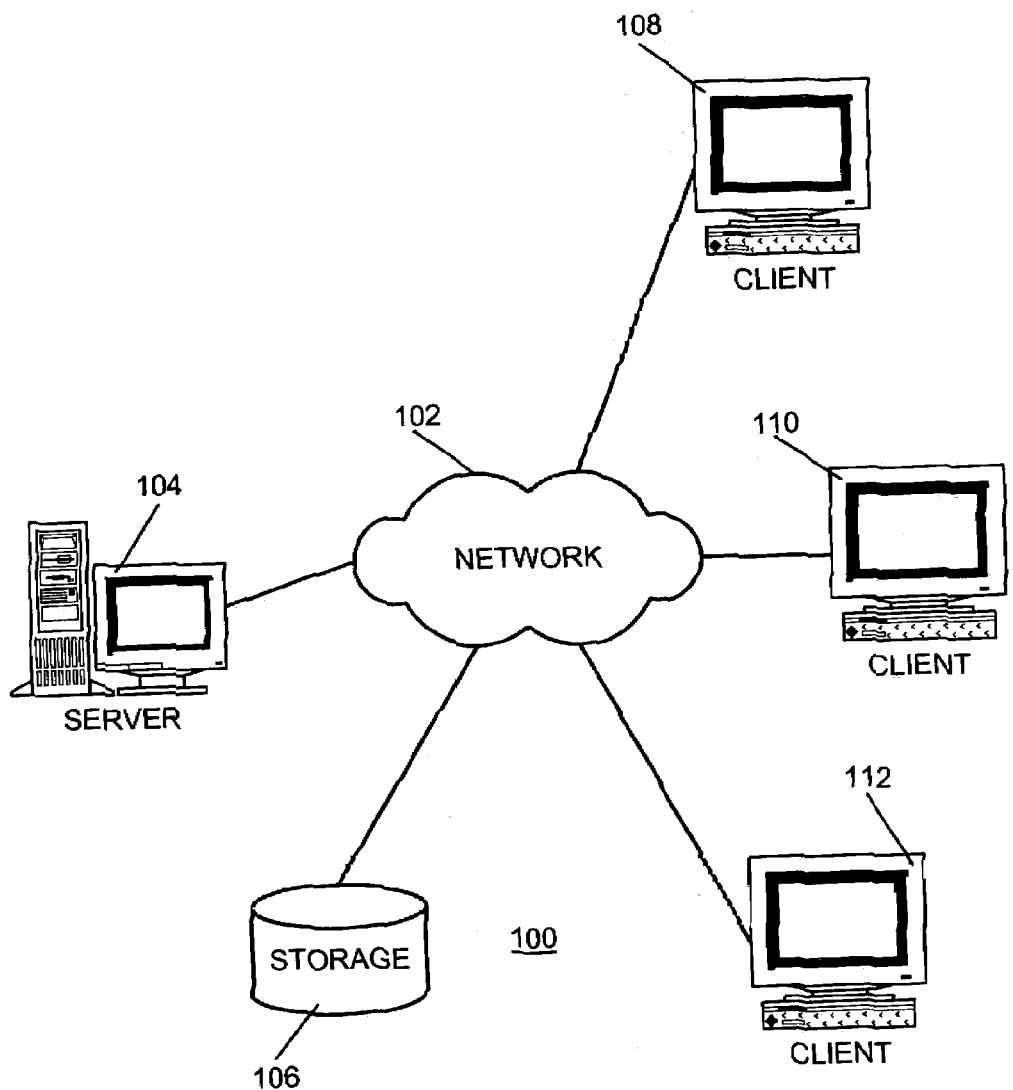
FIG. 1 is an exemplary block diagram illustrating a distributed data processing system according to the present invention.

With reference now to the figures, FIG. 1 depicts a pictorial representation of a network of data processing systems in which the present invention may be implemented. Network data processing system 100 is a network of computers in which the present invention may be implemented. Network data processing system 100 contains a network 102, which is the medium used to provide communications links between various devices and computers connected together within network data processing system 100. Network 102 may include connections, such as wire, wireless communication links, or fiber optic cables.

In the depicted example, server 104 is connected to network 102 along with storage unit 106. In addition, clients 108, 110, and 112 are connected to network 102. These clients 108, 110, and 112 may be, for example, personal computers or network computers. In the depicted example, server 104 provides data, such as boot files, operating system images, and applications to clients 108, 110 and 112. Clients 108, 110 and 112 are clients to server 104. Network data processing system 100 may include additional servers, clients, and other devices not shown. In the depicted example, network data processing system 100 is the Internet with network 102 representing a worldwide collection of networks and gateways that use the TCP/IP suite of protocols to communicate with one another. At the heart of the Internet is a backbone of high-speed data communication lines between major nodes or host computers, consisting of thousands of commercial, government, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the present invention.

Figure 2:
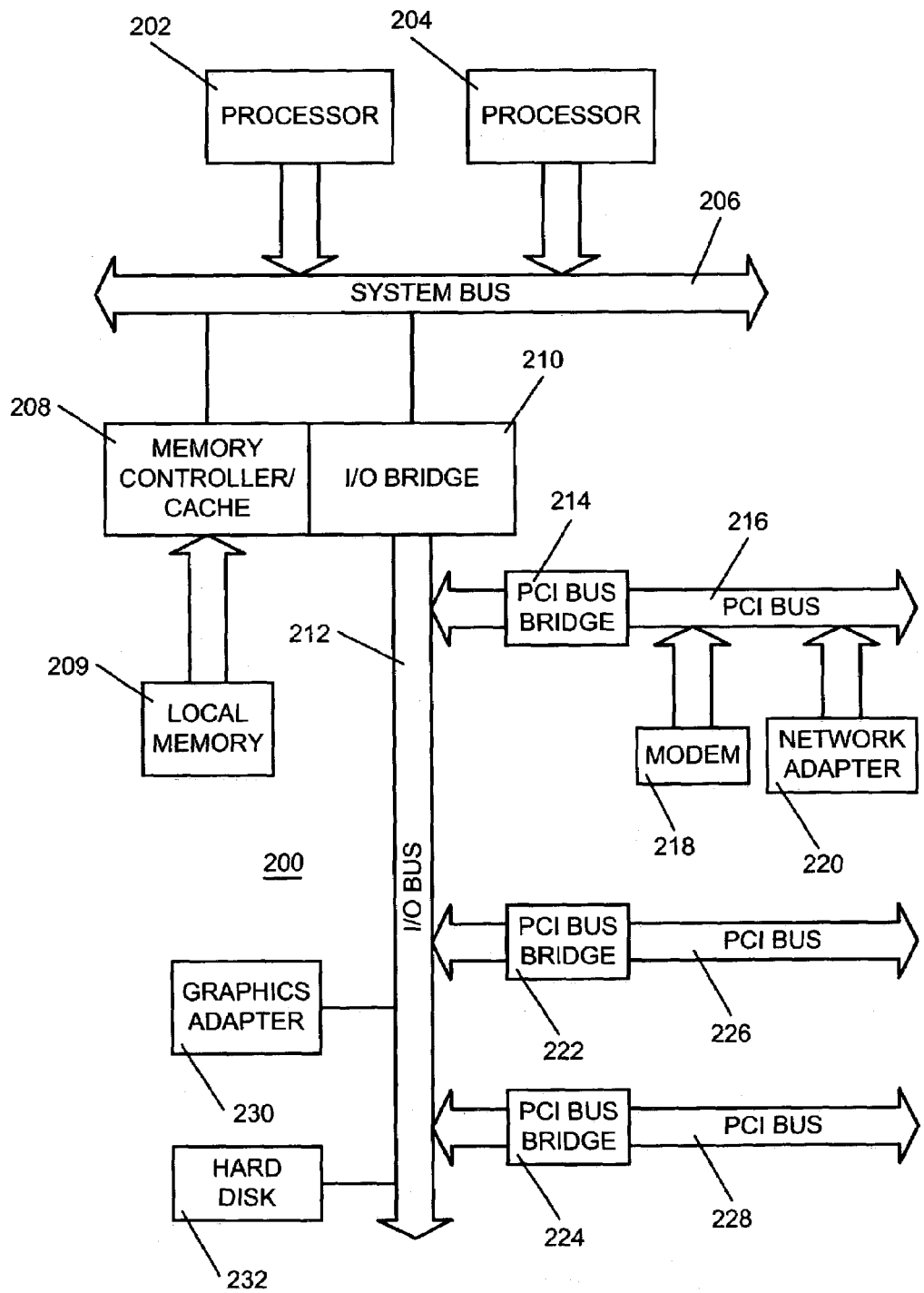
FIG. 2 is an exemplary block diagram of a server apparatus according to the present invention.

Referring to FIG. 2, a block diagram of a data processing system that may be implemented as a server, such as server 104 in FIG. 1, is depicted in accordance with a preferred embodiment of the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems may be connected to PCI local bus 216. Typical PCI bus implementations will support four PCI expansion slots or add-in connectors. Communications links to network computers 108, 110 and 112 in FIG. 1 may be provided through modem 218 and network adapter 220 connected to PCI local bus 216 through add-in boards. Additional PCI bus bridges 222 and 224 provide interfaces for additional PCI local buses 226 and 228, from which additional modems or network adapters may be supported. In this manner, data processing system 200 allows connections to multiple network computers. A memory-mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 2 may be, for example, an IBM e-Server pSeries system, a product of International Business Machines Corporation in Armonk, N.Y., running the Advanced Interactive Executive (AIX) operating system or LINUX operating system.

Figure 3:
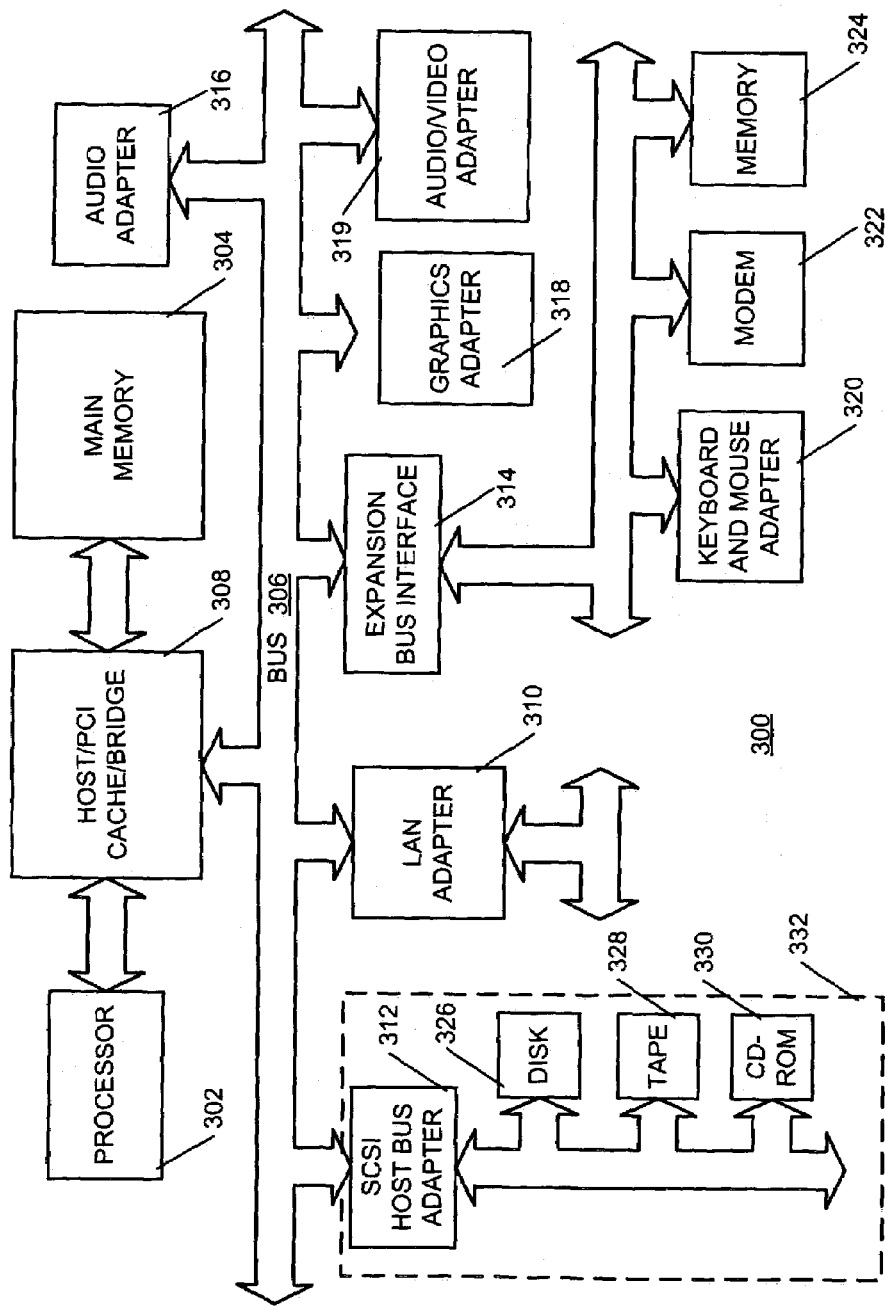
FIG. 3 is an exemplary block diagram of a client apparatus according to the present invention.

With reference now to FIG. 3, a block diagram illustrating a data processing system is depicted in which the present invention may be implemented. Data processing system 300 is an example of a client computer. Data processing system 300 employs a peripheral component interconnect (PCI) local bus architecture. Although the depicted example employs a PCI bus, other bus architectures such as Accelerated Graphics Port (AGP) and Industry Standard Architecture (ISA) may be used. Processor 302 and main memory 304 are connected to PCI local bus 306 through PCI bridge 308. PCI bridge 308 also may include an integrated memory controller and cache memory for processor 302. Additional connections to PCT local bus 306 may be made through direct component interconnection or through add-in boards. In the depicted example, local area network (LAN) adapter 310, SCSI host bus adapter 312, and expansion bus interface 314 are connected to PCI local bus 306 by direct component connection. In contrast, audio adapter 316, graphics adapter 318, and audio/video adapter 319 are connected to PCI local bus 306 by add-in boards inserted into expansion slots. Expansion bus interface 314 provides a connection for a keyboard and mouse adapter 320, modem 322, and additional memory 324. Small computer system interface (SCSI) host bus adapter 312 provides a connection for hard disk drive 326, tape drive 328, and CD-ROM drive 330. Typical PCI local bus implementations will support three or four PCI expansion slots or add-in connectors.

An operating system runs on processor 302 and is used to coordinate and provide control of various components within data processing system 300 in FIG. 3. The operating system may be a commercially available operating system, such as Windows XP, which is available from Microsoft Corporation. An object oriented programming system such as Java may run in conjunction with the operating system and provide calls to the operating system from Java programs or applications executing on data processing system 300. "Java" is a trademark of Sun Microsystems, Inc. Instructions for the operating system, the object-oriented operating system, and applications or programs are located on storage devices, such as hard disk drive 326, and may be loaded into main memory 304 for execution by processor 302.

Those of ordinary skill in the art will appreciate that the hardware in FIG. 3 may vary depending on the implementation. Other internal hardware or peripheral devices, such as flash ROM (or equivalent nonvolatile memory) or optical disk drives and the like, may be used in addition to or in place of the hardware depicted in FIG. 3. Also, the processes of the present invention may be applied to a multiprocessor data processing system.

As another example, data processing system 300 may be a stand-alone system configured to be bootable without relying on some type of network communication interface, whether or not data processing system 300 comprises some type of network communication interface. As a further example, data processing system 300 may be a Personal Digital Assistant (PDA) device, which is configured with ROM and/or flash ROM in order to provide non-volatile memory for storing operating system files and/or user-generated data.

The depicted example in FIG. 3 and above-described examples are not meant to imply architectural limitations.

For example, data processing system 300 may also be a notebook computer or hand held computer in addition to taking the form of a PDA. Data processing system 300 also may be a kiosk or a Web appliance.

The present invention provides a system and method of reducing data corruption due to recycled IP identification numbers. The invention may reside on any data storage medium (i.e., floppy disk, compact disk, hard disk, ROM, RAM, etc.) used by a computer system.

The invention may be local to client systems 108, 110 and 112 of FIG. 1 or to the server 104 and/or to both the server 104 and clients 108, 110 and 112 and/or to any intermediate device between a client and server that may fragment IP packets. To explain, two transport protocols are utilized to transfer data over the Internet. The two transport protocols are Transmission Control Protocol (TCP) and User Datagram Protocol (UDP). TCP is used to provide a reliable connection on top of unreliable IP. To provide the reliable connection, TCP divides a piece of data that is longer than a path maximum transmission unit (explained later) into packets. A TCP header is added to each packet. Each header contains a number that identifies the packet to the overall data to which it belongs as well as the order of the packet in relation to the other packets. The target host must acknowledge receipt of each one of the packets. Any packet for which a receipt acknowledgement is not obtained has to be retransmitted.

Figure 4A:
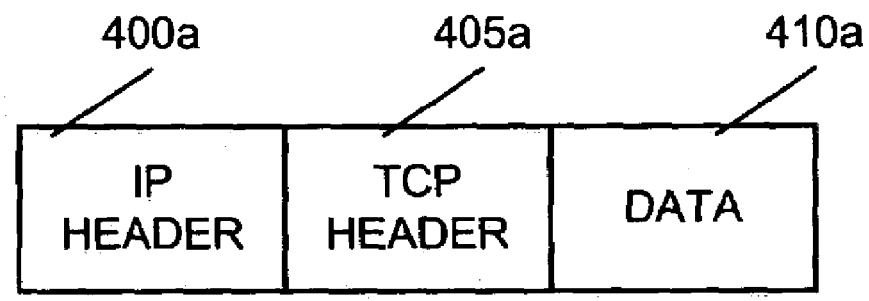
FIG. 4a depicts a data packet with a TCP/IP header.

FIG. 4a depicts a data packet with a TCP/IP header. When data is to be transmitted to a receiving host from a transmitting host, the transmitting host will first divide the data into packets, if the data is of a length longer than the allowable data packet length. Each packet then is sent to a TCP stack where a TCP header 405a is added to data 410a. From the TCP stack, the data packet including the TCP header 405a is forwarded to an IP stack. There, IP header 400a is added to the data packet. Once the IP header is added, the data packet is allowed to enter the network through a network interface (e.g., an Ethernet adapter).

It is generally accepted that for efficient data transfer using an IP connection, the data packet size should be as large as possible. The larger the packets, the lesser the overhead associated with transferring the entire piece of data. However, if a packet is larger than any intermediate link (e.g., a router) can process, the packet will be fragmented at that link. The maximum size of a packet that an intermediate link can process without fragmenting the packet is called an MTU (maximum transmission unit). The maximum size of a packet that can be transferred from a transmitting host to a receiving host without fragmentation is called PMTU (path maximum transmission unit). Consequently, the PMTU is a function of the maximum size packets that all intermediate links in an IP connection can process without fragmenting the packets.

It is well known, however, that the path between two hosts on the Internet may vary over time. Indeed, there have been path variations based on types of data being transferred between two hosts. Consequently, the PMTU may vary. If the PMTU decreases during transmission of a particular piece of data, the packets may have to be fragmented. Thus in that case, the invention may reside in any intermediate link that may fragment a packet.

Figure 4B:
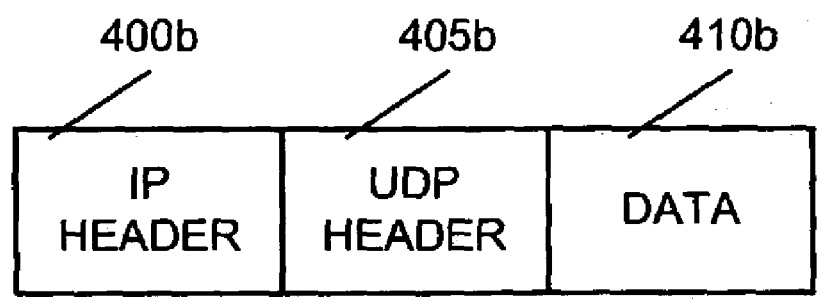
FIG. 4b depicts a data packet with a UDP/IP header.

UDP, on the other hand, does not provide a reliable connection on top of IP. FIG. 4b is a piece of data with a UDP/IP header. Specifically, when a piece of data is to be transmitted, a UDP header is added to the entire piece of data at the UDP stack. The data will then be sent to the IP stack where an IP header will be added. If the data size is greater than the PMTU, it will be fragmented before it enters the network. The target host need not acknowledge receipt of any fragments of the packet. Thus, if a fragment is lost or dropped, it will not be resent. In any case, since the transmitting host may fragment the UDP/IP packet, then the invention may be local to client systems 108, 110 and 112 of FIG. 1 or to the server 104 or to both the server 104 and clients 108, 110 and 112.

The description of the invention will be focused on the IP header, since the TCP or UDP header is not necessary to fully understand the invention. FIG. 5 depicts an IP header in bytes format. Version 50b is the version of the IP protocol used to create the data packet and header length 502 is the length of the header. Service type 504 specifies how an upper layer protocol would like a current data packet handled. Specifically, each data packet is assigned a level of importance. Total length 506 specifies the length, in bytes, of the entire IP data packet, including the data and header.

IP identification 508 is used when a packet is fragmented into smaller pieces while traversing a network. This identifier is assigned by the transmitting host so that different fragments arriving at the destination host can be associated with each other for re-assembly. For example, if while traversing the network a router fragments the packet, the router will use the IP identification number in the header of the packet with all the fragments. Thus; when the fragments arrive at their destination they can be easily identified.

Flags 510 is used for fragmentation and re-assembly purposes. The first bit is called "More Fragments" (MF) bit and is used to indicate whether the packet is fragmented. For example, if the bit is set in the IP header of a current fragment, then there is at least one fragment that follows the current fragment. If the bit is not set, the current fragment is not followed by another fragment and the receiver may begin re-assembling the packet. The second bit is the "Do not Fragment" (DF) bit, which suppresses fragmentation. The third bit is unused and is always set to zero (0).

Fragment Offset 512 indicates the position of the fragment in the original packet. In the first packet of a fragment stream, the offset will be zero (0). In subsequent fragments, this field indicates the offset in increments of 8 bytes. Thus, it allows the destination IP process to properly reconstruct the original data packet.

Time-to-Live 514 maintains a counter that gradually decrements each time a router handles the data packet. When it is decremented down to zero (0), the data packet is discarded. This keeps data packets from looping endlessly on the network. Protocol 516 indicates which upper-layer protocol (e.g., TCP, UDP etc.) is to receive the data packets after IP processing has completed at the destination host. Checksum 518 helps ensure the IP header integrity. Source IP Address 520 specifies the transmitting host and destination IP Address 522 specifies the receiving host. Options 524 allows IP to support various options (e.g., security).

As mentioned before, with the use of the Gigabit Ethernet the whole range of IP identification numbers may repeat every second. The invention proposes to use fragment-size variations to distinguish between fragments of two packets with the same IP identification number on the network. The size of the fragments will vary between the path maximum transmission unit (PMTU) and a minimum transmission unit. However, the minimum transmission unit should not be so small as to lead to the network being flooded with a lot of small packet fragments. In this particular example, the minimum transmission unit will be set at 500 bytes, one third of the Ethernet MTU of 1500 bytes.

To better understand the invention, an example will be used. The example will make use of a UDP/IP packet; however, it should be understood that the example is equally applicable to a TCP/IP packet. Thus, the example is for illustrative purposes only.

Suppose a UDP/IP packet of size 2000 bytes (including IP header and UDP header) is to be routed through a network with PMTU of 800 Bytes. Since PMTU is 800 bytes, the packet will have to be fragmented. Each fragment may carry a maximum of 780 bytes of data (i.e., 800 bytes minus 20 bytes of IP header that excludes the options field). Since data (including UDP header) is transferred in octets (i.e., 8-byte multiples), the IP fragment can only carry 776 bytes since 780 is not a multiple of 8. Thus, fragment MTU is 776. The total number of fragments then is equal to 3 (i.e., 1980÷776=2.55 rounded up to 3). Thus, the first and the second fragments will be of 776 bytes and the third fragment will be of 428 bytes.

FIG. 6 depicts values of relevant fields of the IP header of each of the fragments in the example above. The IP identification number 508 of each fragment is the same as the IP identification number of the original packet that has been fragmented (i.e., 255). This identifies the fragments as being related to each other. The fragment offset 512 of the first fragment is 0 while that of the second fragment is 776, the size of the first fragment or the fragment MTU. The fragment offset of the third packet is 1552, the size of the first fragment added to the size of the second fragment (i.e., 2 fragment MTUs). The MF bit of flags 510 of the first fragment is set since there is at least one fragment to follow. MF bit of the flags 510 of the second fragment is also set for the same reason. However, the MF bit of the flags 510 of the third fragment is not set since it is the last fragment. Note that only the first fragment has the UDP header.

According to the invention, each time the IP identification number is cycled through its possible numbers, the size of the first fragment of a packet is decremented. The first fragment of a packet will continue to be decremented (at each IP identification cycle) until it reaches a pre-defined minimum transmission unit. When that occurs, the size of the first fragment will again be set to the fragment MTU.

To follow with the example above, the first time the IP identification goes through the 65,536 unique IP numbers, the first fragment of a fragmented packet will be set to fragment MTU. The second time it goes through the 65,536 unique IP numbers, the first fragment will be 768, an octet less, than fragment MTU (see FIG. 7). The size of the first fragment of a fragmented packet will be decremented by an octet each time the IP numbers cycle through the 65,536 unique numbers until it becomes less than 500 bytes, the minimum transmission unit defined above. At that point, the size of the first fragment will again be set to fragment MTU.

Note that by decreasing the size of the first fragment, the fragment offset of both the second and third fragments (see FIG. 7) is different from the fragment offset of the second and third fragments in FIG. 6. Thus, the likelihood that two fragments of different packets with the same IP identification number will be mistaken as being part of the same packet is greatly reduced.

Figure 8:
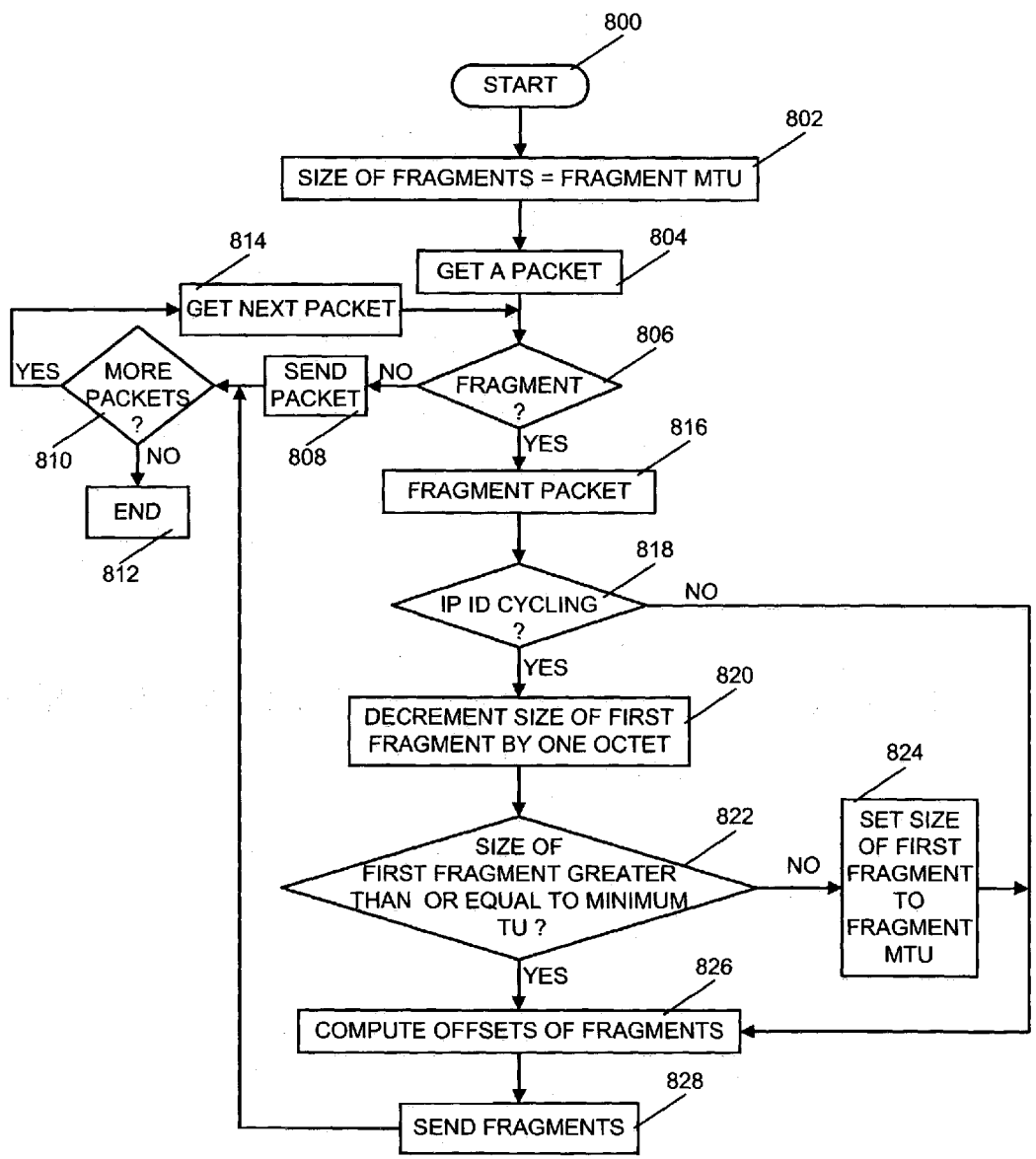
FIG. 8 is a flow chart of a process that may be used by a device that may fragment a packet.

FIG. 8 is a flowchart of a process that may be used by a device that may fragment a packet. The process starts when data is to be transmitted over a network (step 800). The process sets the size of the fragments to fragment MTU and obtains a packet (steps 802 and 804). A check is then made to determine whether the packet is to be fragmented. If not, the packet is allowed to enter the network. Then the process determines whether there are more packets to be sent over the network. If not, the process ends (steps 806, 808, 810 and 812). If there are more packets to be sent over the network, the process obtains the next packet and jumps to step 806 (steps 810, 814 and 806).

If the packet is to be fragmented, it is fragmented. Then the process determines whether the IP identification numbers are recycling. This can be done by using a counter and a timer. That is, each time the first number in the unique numbers is used within a certain amount of time (e.g., one second in the case of the Gigabit Ethernet), the counter is incremented. If the counter is not incremented within that span of time, it is reset to zero. Thus, if the counter is any number other than zero (0), the IP identification numbers are recycling. This is done for performance reasons. Specifically, if the IP identification numbers are not recycling through its unique numbers the invention need not be used.

In any case, if the IP identification numbers are not recycling, the offsets of the fragments are computed. When computing the offsets, however, all the relevant fields in the IP header will be taken care of as well (see FIGS. 6 and 7). The fragments are then allowed to enter the network and the process jumps back to step 810 (steps 806, 816, 818, 826, 828 and 810). If the IP identification numbers are recycling, the size of the first fragment is decremented by one octet and a check is made to determine whether its size is still greater or equal to minimum transmission unit. If the size of the first packet is greater or equal to minimum transmission unit, the process computes the offsets of the fragments before they are allowed to enter the network and the process jumps back to step 810 (steps 818, 820 822, 826, 828 and 810). If the size of the first fragment is less than minimum transmission unit, then the size of the first packet is set to fragment MTU. The process then computes the offsets of the fragments and sends the fragments over the network before it jumps back to step 810 (steps 822, 824, 826, 828 and 810).

Figure 9:
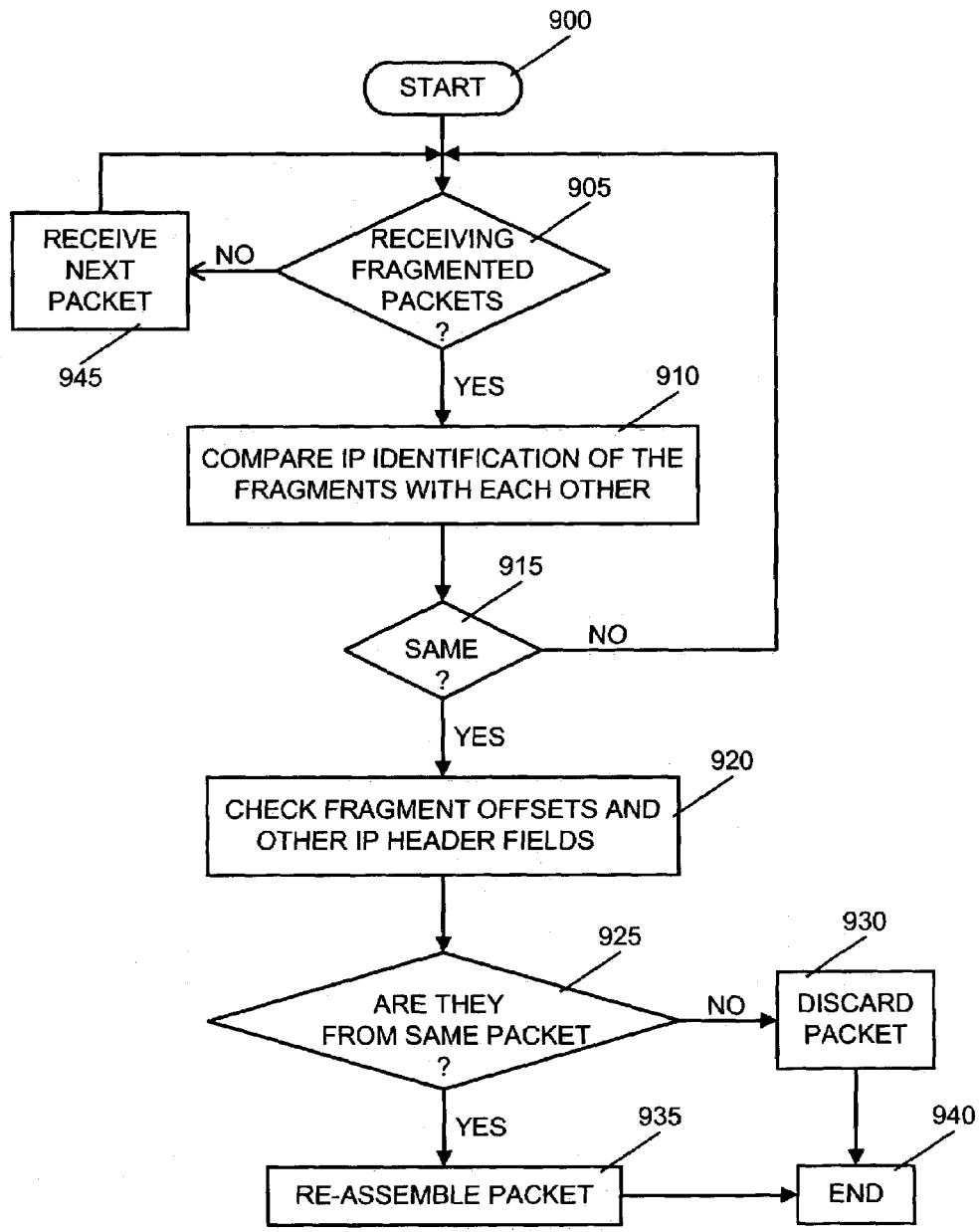
FIG. 9 is a flow chart of a process that may be used by a receiving host.

FIG. 9 is a flowchart of a process that may be used by a receiving host. The process starts when the host starts receiving data (step 900). Then a check is made to determine whether the data is a fragmented packet by checking the fragment offset 512 in the IP header of the data received. If the fragment offset is set to a number then the data received is a fragment of a packet. If the data received is not a fragmented packet, then the next packet is received and the process returns to step 905 (step 905 and 945). If the data received is a fragmented packet, then the IP identification number of each fragment is obtained to determine the fragment that may be from the same packet. The fragment offset of each fragment as well as other pertinent IP header fields (see FIGS. 6 and 7) is then scrutinized to determine whether the fragments are from the same packet. If so, the packet will be re-assembled using the fragments and the process ends. If not, the fragments will be discarded before the process ends (steps 905, 910, 915, 920, 925, 930, 935 and 940).

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method of reducing data corruption due to recycled Internet Protocol (IP) identification numbers comprising the steps of:
   determining whether packets are to be divided into fragments;
   determining, if packets are to be divided into fragments, whether IP identification numbers are being recycled; and
   setting a size of a first fragment of a packet to a maximum transmission unit (MTU), if the IP identification numbers are recycling and decrementing the size of the first fragment of a packet each time the IP identification numbers recycle.

2. The method of claim 1 wherein the size of the first fragment of a packet is decremented until it is equal to a predefined minimum transmission unit.

3. The method of claim 2 wherein each time the size of the first fragment of a packet is to be decremented, it is decremented by one octet.

4. The method of claim 3 wherein after being equal to the minimum transmission unit, the size of the first fragment is set to MTU the next time the IP identification numbers recycle.

5. The method of claim 4 wherein when the first fragment of a packet is decremented, the fragment offset of all other fragments of the packet is modified.

6. The method of claim 5 wherein if the IP identification number of all fragments is the same and the fragment offset of a fragment is not consistent with each other, the packet is discarded.

7. The method of claim 6 wherein if the IP identification number of all fragments is the same and the fragment offset of a fragment is consistent with each other, the fragments are used to re-assemble the packet.

8. The method of claim 7 wherein the packet is discarded or re-assembled by a receiving host.

9. A computer program product on a computer readable medium for reducing data corruption due to recycled Internet Protocol (IP) identification numbers comprising:
   code means for determining whether packets are to be divided into fragments;
   code means for determining, if packets are to be divided into fragments, whether IP identification numbers are being recycled; and
   code means for setting a size of a first fragment of a packet to a maximum transmission unit (MTU) if the IP identification numbers are recycling and decrementing the size of the first fragment of a packet each time the IP identification numbers recycle.

10. The computer program product of claim 9 wherein the size of the first fragment of a packet is decremented until it is equal to a predefined minimum transmission unit.

11. The computer program product of claim 10 wherein each time the size of the first fragment of a packet is to be decremented, it is decremented by one octet.

12. The computer program product of claim 11 wherein after being equal to the minimum transmission unit, the size of the first fragment is set to MTU the next time the IP identification numbers recycle.

13. The computer program product of claim 12 wherein when the first fragment of a packet is decremented, the fragment offset of all other fragments of the packet is modified.

14. The computer program product of claim 13 wherein if the IP identification number of all fragments is the same and the fragment offset of a fragment is not consistent with each other, the packet is discarded.

15. The computer program product of claim 14 wherein if the IP identification number of all fragments is the same and the fragment offset of a fragment is consistent with each other, the fragments are used to re-assemble the packet.

16. The computer program product of claim 15 wherein the packet is discarded or re-assembled by a receiving host.

17. A system for reducing data corruption due to recycled Internet Protocol (IP) identification numbers comprising:
   at least one storage system for storing code data; and
   at least one processor for processing the code data to determine whether packets are to be divided into fragments, to determine, if packets are to be divided into fragments, whether IP identification numbers are being recycled, and to set a size of a first fragment of a packet to a maximum transmission unit (MTU) if the IP identification numbers are recycling and decrementing the size of the first fragment of a packet each time the IP identification numbers recycle.

18. The system of claim 17 wherein the size of the first fragment of a packet is decremented until it is equal to a predefined minimum transmission unit.

19. The system of claim 18 wherein each time the size of the first fragment of a packet is to be decremented, it is decremented by one octet.

20. The system of claim 19 wherein after being equal to the minimum transmission unit, the size of the first fragment is set to MTU the next time the IP identification numbers recycle.

* * * * *